United States Patent
Matoba et al.

(10) Patent No.: US 6,195,250 B1
(45) Date of Patent: Feb. 27, 2001

(54) DIELECTRIC CERAMIC COMPOSITION AND LAMINATED CERAMIC PARTS

(75) Inventors: Hiroaki Matoba, Moriyama; Harunobu Sano, Kyoto, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/394,419

(22) Filed: Sep. 13, 1999

(30) Foreign Application Priority Data

Sep. 11, 1998 (JP) .................................................. 10-258052
Aug. 19, 1999 (JP) .................................................. 11-232957

(51) Int. Cl.[7] .............................. H01G 4/06; H01G 4/20; C04B 35/46
(52) U.S. Cl. ..................... 361/321.5; 361/321.4; 361/321.2; 361/320; 501/138; 501/139
(58) Field of Search ..................... 361/311, 312, 361/313, 320, 321.1–321.5, 322; 501/134–139, 32

(56) References Cited

U.S. PATENT DOCUMENTS

| | | | |
|---|---|---|---|
| 5,292,694 | * 3/1994 | Abe et al. | 501/139 |
| 5,756,412 | * 5/1998 | Lee et al. | 501/135 |
| 6,051,516 | * 4/2000 | Mizuno et al. | 501/138 |
| 6,058,005 | * 5/2000 | Matoba et al. | 361/321.4 |

FOREIGN PATENT DOCUMENTS

0814486A1  12/1997  (EP) .
0824261A2  2/1998   (EP) .

* cited by examiner

*Primary Examiner*—Kristine Kincaid
*Assistant Examiner*—Eric Thomas
(74) *Attorney, Agent, or Firm*—Ostrolenk, Faber, Gerb & Soffen, LLP

(57) ABSTRACT

Laminated ceramic parts such as a laminated ceramic condenser and a laminated LC filter are formed by using a temperature compensating dielectric ceramic composition having a high relative dielectric constant and a high Q value, and which can be sintered at a relatively low temperature during the manufacturing processes, without causing any undesired variations in ceramic properties during the sintering treatment. The composition includes 100 parts by weight of a main component having a mole composition ratio (BaO, $TiO_2$, $Re_2O_3$) shown in a ternary composition diagram indicated by an area surrounded by point A (39.5. 59.5, 1), point B (1, 59.5, 39.5), point C (1, 85, 14) and point D (14, 85, 1); about 25 parts by weight or less of a lead free $B_2O_3$—$SiO_2$ glass; at least one of V oxide (the content as $V_2O_5$ being about 10 parts by weight or less) and W oxide (the content as $WO_3$ being about 20 parts by weight or less). Preferably, the composition further contains either about 10 parts by weight or less of CuO, or about 20 parts by weight or less of MnO.

20 Claims, 3 Drawing Sheets

DIELECTRIC CERAMIC COMPOSITION AND LAMINATED CERAMIC PARTS

BACKGROUND OF THE INVENTION

1. Field of the Invention

The present invention relates to a temperature compensating dielectric ceramic composition, and laminated ceramic parts such as a laminated ceramic condenser and a laminated LC filter, each of which is formed by using such a temperature compensating dielectric ceramic composition.

2. Description of the Related Art

Conventionally, a temperature compensating ceramic condenser has been used as one of widely used electronic parts in various electronic devices in order to effect desired turning, oscillating and the like. Meanwhile, it has been demanded that the temperature compensating ceramic condenser be made compact in size, its dielectric loss should be small and its dielectric property be stable. As dielectric ceramic parts capable of satisfying the above requirements, it has been demanded that they should have a large relative dielectric constant and a small dielectric loss (namely, a large Q value) although its size is required to be small.

As such a desired dielectric ceramic mentioned above, there has been suggested a series of BaO—TiO$_2$ dielectric ceramic composition (H. M. O'Brayan, J. Am, Ceram. Soc. 57(1974) 450; Japanese Examined Patent Publication 58-20905). Although a laminated ceramic condenser formed by using these dielectric ceramic compositions has been in actual use, since the sintering temperature involved in the manufacturing of such a product is as high as 1300 to 1400° C., its internal electrode has to be made by a noble metal such as palladium (Pd) and platinum (Pt) capable of resisting such high temperature.

As some dielectric ceramic compositions which can be sintered at a relatively low temperature during their manufacturing processes, Japanese Unexamined Patent Publication No. 8-239262 has suggested a dielectric ceramic composition containing BaO—TiO$_2$—Nd$_2$O$_3$ as its main component and a PbO—V$_2$O5—B$_2$O$_3$—SiO$_2$ glass as an additive. For the same purpose, Japanese Unexamined Patent Publication No. 9-71462 has disclosed another dielectric ceramic composition containing BaO—TiO$_2$—Nd$_2$O$_3$—Sm$_2$O$_3$ as its main component and also containing an additive which is a PbO—ZnO—B$_2$O$_3$ glass having a softening point of 500° C. or lower.

Since it is desired to let the dielectric ceramic compositions disclosed in Japanese Unexamined Patent Publication No. 8-239262 and Japanese Unexamined Patent Publication No. 9-71462 be sintered at a relatively low temperature during their manufacturing processes, each of the dielectric ceramic composition is formed by incorporating a glass which contains a Pb oxide component. Since the Pb oxide component has a high volatility during the process of manufacturing the glass and in a process of sintering the ceramic, the Pb oxide content will be different from lot to lot or even different in different portions of the same lot. As a result, there has been a problem that the properties of thus obtained ceramic are not stable.

SUMMARY OF THE INVENTION

It is an object of the present invention to provide an improved temperature compensating dielectric ceramic composition, and laminated ceramic parts such as a laminated ceramic condenser and a laminated LC filter, each of which is formed by using a temperature compensating dielectric ceramic composition having a high relative dielectric constant and a high Q value, and which can be sintered at a relatively low temperature during their manufacturing processes, without causing any undesired variations in ceramic properties during the sintering treatment.

In order to achieve the above object, a dielectric ceramic composition of the present invention comprises 100 parts by weight of a main component represented by a formula xBaO-yTiO$_2$-zRe$_2$O$_3$ (wherein x+y+z=100 and Re is at least one rare earth element), having the mole composition ratio of BaO, TiO$_2$ and Re$_2$O$_3$ shown in a ternary composition diagram of FIG. 1, which is indicated by an area surrounded by point A (39.5. 59.5, 1), point B (1, 59.5, 39.5), point C (1, 85, 14) and point D (14, 85, 1); about 25 parts by weight or less of a first sub-component which is a B$_2$O$_3$—SiO$_2$ glass not containing Pb oxide; a second sub-component which is at least one substance selected from V oxide and W oxide, the content of V oxide in the form of V$_2$O$_5$ being about 10 parts by weight or less and the content of W oxide in the form of WO$_3$ being about 20 parts by weight or less.

Further, another dielectric ceramic composition of the present invention comprises 100 parts by weight of a main component represented by a formula x(Ba$_\alpha$Ca$_\beta$Sr$_\gamma$)O-y{(TiO$_2$)$_{1-m}$(ZrO$_2$)$_m$}-zRe$_2$O$_3$ (wherein x+y+z=100, α+β+γ=1, 0≦β+γ<0.8, 0≦m<0.15, but not including the case where β+γ=0 and m=0; Re is at least one rare earth element) having a mole composition ratio of ((Ba$_\alpha$Ca$_\beta$Sr$_\gamma$)O, (TiO$_2$)$_{1-m}$(ZrO$_2$)$_m$ and Re$_2$O$_3$ shown in a ternary composition diagram of FIG. 2, which is indicated by an area surrounded by point A (39.5. 59.5, 1), point B (1, 59.5, 39.5), point C (1, 85, 14) and point D (14, 85, 1); about 25 parts by weight or less of a first sub-component which is a B$_2$O$_3$—SiO$_2$ glass not containing Pb oxide; a second sub-component which is at least one substance selected from V oxide and W oxide, the content of V oxide in the form of V$_2$O$_5$ being about 10 parts by weight or less and the content of W oxide in the form of WO$_3$ being about 20 parts by weight or less.

Moreover, the dielectric ceramic composition of the present invention, apart from the above first and second sub-components, can further contain a third sub-component that is Cu oxide which in the form of CuO is in an amount of about 10 parts by weight or less with respect to 100 parts by weight of the main component.

In addition, the dielectric ceramic composition of the present invention, apart from the above first and second sub-components, or apart from the above first and second and third sub-components, can further contain a fourth sub-component that is Mn oxide which in the form of MnO is in an amount of about 20 parts by weight or less with respect to 100 parts by weight of the main component.

The laminated ceramic parts of the present invention can include a plurality of dielectric ceramic layers, internal electrodes formed between the dielectric ceramic layers, and external electrodes electrically connected with said internal electrodes, characterized in that said dielectric ceramic layers are formed by a dielectric ceramic composition recited above, said internal electrodes are formed by Cu or Ag serving as their main components.

The rare earth elements discussed in the present invention are La, Ce, Pr, Nd, Pm, Sm, Eu, Gd, Tb, Dy, Ho, Er, Tm, Yb or Lu.

DESCRIPTION OF THE PREFERRED EMBODIMENTS

Figure 3:
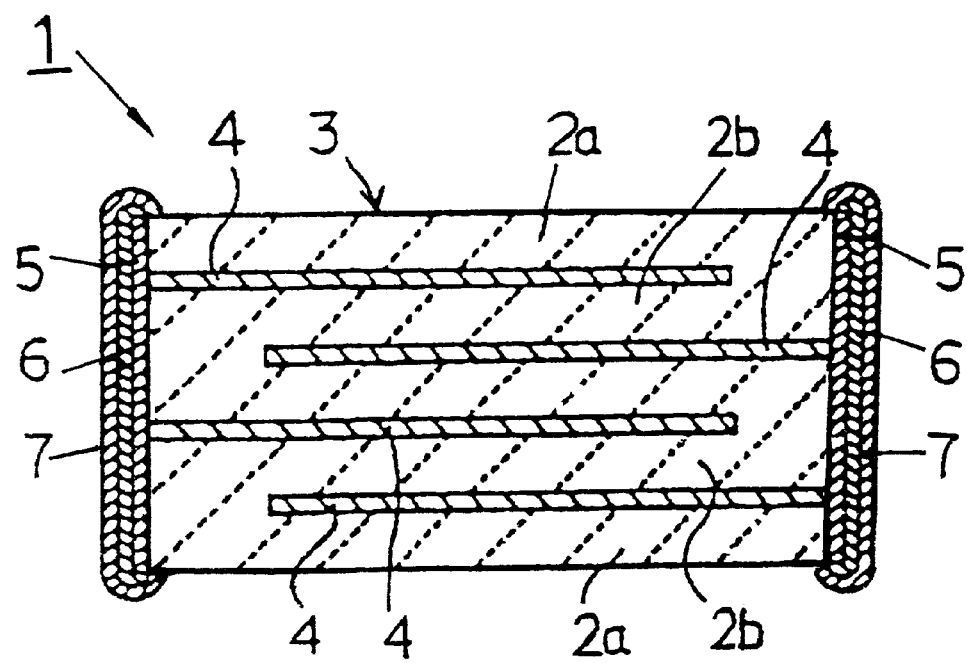
FIG. 3 is a cross sectional view schematically indicating a laminated ceramic condenser made according to one embodiment of the present invention.
Figure 4:
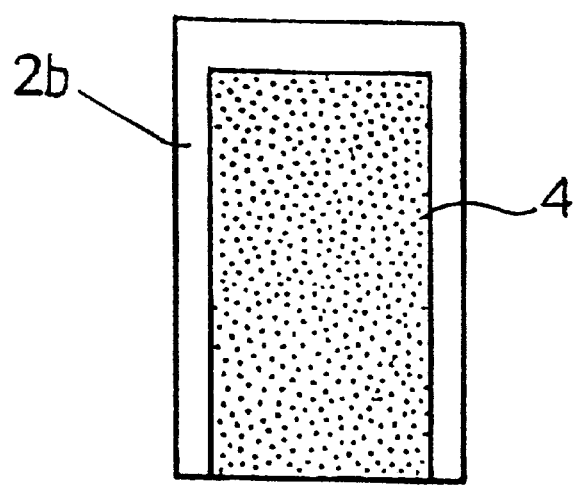
FIG. 4 is a plane view schematically indicating a dielectric ceramic layer carrying an internal electrode, which is a part of the laminated ceramic condenser of FIG. 3.
Figure 5:
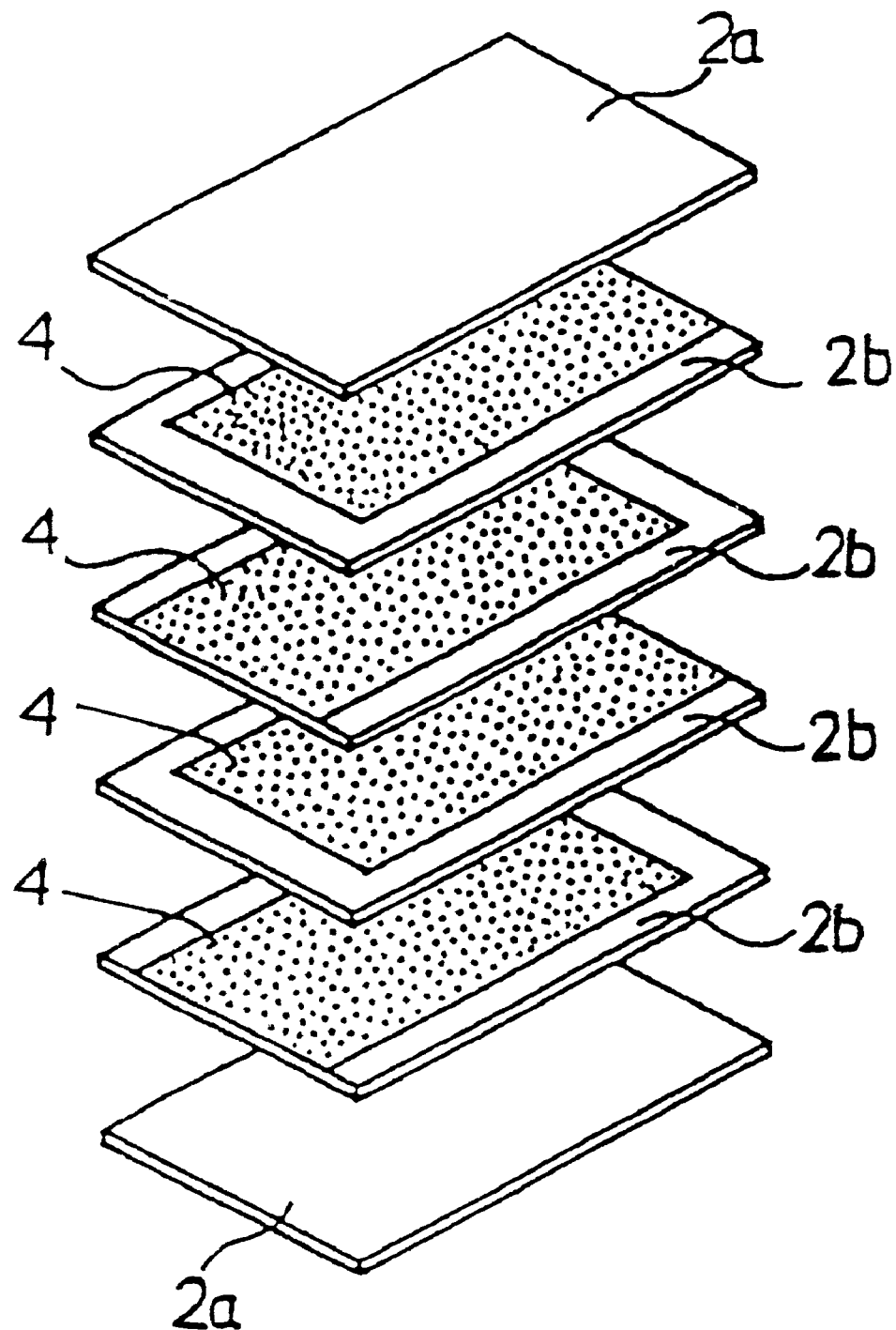
FIG. 5 is an exploded perspective view schematically indicating several ceramic layers forming a laminated structure, which is a part of the laminated ceramic condenser of FIG. 3.

At first, a description will be made to explain in detail a basic construction of a laminated ceramic condenser made according to a first embodiment of the present invention, with reference to the accompanying drawings. FIG. 3 is a cross sectional view schematically indicating one example of a laminated ceramic condenser of the present invention. FIG. 4 is a plane view schematically indicating a dielectric ceramic layer having an internal electrode, which is one portion of the laminated ceramic condenser of FIG. 3. FIG. 5 is an exploded perspective view schematically indicating laminated ceramic layers which are used to form the laminated ceramic condenser of FIG. 3.

The laminated ceramic condenser 1 made according to the present embodiment, as shown in FIG. 3, is comprised of a parallelepiped ceramic dielectric body 3 obtained by laminating a plurality of dielectric ceramic layers 2a, 2b with several internal electrodes 4 formed therebetween. On either end face of the ceramic laminated body 3, there is formed an external electrode 5 which is provided in a manner such that it is electrically connected to some specific internal electrodes. Further, if necessary, there are also formed a first plating layer 6 and a second plating layer 7 on either external electrode 5.

A method of manufacturing the above laminated ceramic condenser 1 will be described below.

At first, amounts of the raw material powders forming the dielectric ceramic layers 2a and 2b are prepared by weighing. Namely, the raw material powders are prepared which can be used to form the dielectric ceramic composition, such raw material powders containing a main component which is $BaO$—$TiO_2$—$Re_2O_3$ (however, it also includes the case where Ba has been replaced by Ca or Sr and the case where $TiO_2$ has been replaced by $ZrO_2$), a first sub-component which is a $B_2O_3$—$SiO_2$ glass (not containing Pb oxide), and a second sub-component which is at least one substance selected from V oxide and W oxide. Preferably, it is also desired to prepare raw material powders for forming the dielectric ceramic composition further containing a third sub-component that is Cu oxide or a fourth sub-component that is Mn oxide.

Next, an organic binder is added to the above raw material powders so as to form a slurry which is in turn formed into a sheet, thereby obtaining a green sheet useful for forming the dielectric ceramic layers 2a and 2b. After that, as shown in FIG. 4, an internal electrode 4 containing Cu or Ag as its main component is formed on one surface of a green sheet which will later be formed into the dielectric ceramic layer 2b. As a method for forming the internal electrode 4, it is also allowed to employ other methods such as screen printing, vapor deposition or plating.

Subsequently, as shown in FIG. 5, a plurality of green sheets for forming a dielectric ceramic layer 2b and each having an internal electrode 4 formed thereon, are arranged to be laminated in a manner shown in the drawing. Then, these green sheets are disposed so as to be pressed between two other green sheets which will later be formed into the dielectric layers 2a each of which does not carry an internal electrode, thereby obtaining a green sheet laminated body. Afterwards, the green sheet laminated body is sintered at a predetermined temperature, thus obtaining a ceramic laminated body 3 as shown in FIG. 3.

Next, on either end face of the ceramic laminated body 3 is formed an external electrode 5 which is provided in a manner such that it is electrically connected to the internal electrodes 4. As a material for forming the external electrodes 5, one can use the same material as that for forming the internal electrodes 4. For instance, one can use a silver-palladium alloy. Further, it is also possible to employ a mixture containing a powder of such an alloy serving as a main component and glass frits serving as additives which may be $B_2O_3$—$SiO_2$—$BaO$ glass, $Li_2O$—$SiO_2$—$BaO$ glass or the like. In addition, a material for forming the external electrodes 5 may also be selected properly by taking into account where and how the laminated ceramic condenser is to be used. Also, an external electrode 5 may also be formed by coating the sintered ceramic laminated body 3 with a metal powder paste, followed by baking treatment. However, from the view of a specific material for forming such an electrode, it is also possible that the above metal powder paste may be applied to the green sheet laminated body before the sintering treatment, thus making it possible to form the electrodes 5 at exactly the same time while forming the ceramic laminated body 3.

Then, the surface of each external electrode 5 is coated with nickel or copper by means of plating treatment, so as to form a first plating layer 6 (FIG. 3). Finally, a second plating layer 7 which is solder or tin is formed on the first plating layer 6, thereby producing a laminated ceramic condenser 1 as a completed product. If allowed in view of the actual use of the laminated ceramic condenser and in view of an actual place for it to be used, it is also possible to dispense with the process for forming an electrically conductive layer by means of a plating treatment on the surface of each of the external electrodes 5.

In this way, the ceramic composition of the present invention serving as a dielectric material for a laminated ceramic condenser, can be sintered at a temperature lower than the melting point of Cu or Ag. Further, with the ceramic thus obtained, its relative dielectric constant is 40 or more, its Q value is 1000 or more under a condition of 1 MHZ, and its electrical resistivity is $10^9$ or more at a temperature of 125° C. Moreover, as a sub-component, it is also possible to add a predetermined amount of Cu oxide or Mn oxide in the ceramic composition, thereby further increasing the Q value.

EXAMPLES

The present invention will be described in more detail below in accordance with several examples.

Example 1

A dielectric ceramic composition of the present invention and a ceramic condenser formed by using the dielectric ceramic composition were prepared in the following process.

At first, starting raw materials were prepared which included barium carbonate ($BaCO_3$), calcium carbonate (CaCO$_3$), strontium carbonate (SrCO$_3$), titanium oxide (TiO$_2$), zirconium oxide (ZrO$_2$), rare earth oxide (Re$_2$O$_3$), vanadium oxide (V$_2$O$_5$), tungsten oxide (WO$_3$), copper oxide (CuO) and manganese carbonate (MnCO$_3$).

Portions of the powders of the above starting raw materials were taken by weighing so as to obtain various compositions shown in Tables 1 to 4 (not including a glass component serving as the first sub-component). Then, these raw material powders and ethanol were put into a ball-mill and were mixed together in a wet manner for 16 hours, followed by a pre-sintering treatment at a temperature of 1040° C., thereby obtaining a pre-sintered powder material. The contents of V$_2$O$_5$ and WO$_3$ which together serve as the second sub-component, the content of CuO serving as the third sub-component and the content of MnO serving as the fourth sub-component, are all represented in "parts by weight" per 100 parts by weight of a main component which is xBaO-yTiO$_2$-zRe$_2$O$_3$ or $\{x(Ba_\alpha Ca_\beta Sr_\gamma)O$-y(TiO$_2$)O$_{1-m}$(ZrO$_2$)$_m$-zRe$_2$)$_3\}$ (also including the case wherein $\beta+\gamma=0$ or m=0).

In all Tables below, sample numbers with marks * are those in the ranges out of the scope of the present invention, while those not having marks * are in the ranges of the scope of the present invention.

As the first sub-component, a B$_2$O$_3$—SiO$_2$ glass powder was prepared which had a softening point of 550° C. and may be further represented by 41.4B$_2$O$_{3-29.5}$Li$_{20-25.2}$SiO$_{2-3.9}$MnO (numerical factors are weight %).

The above glass powder and the above pre-sintered powders were weighed in accordance with the percentages shown in Tables 1 to 4. Then, a polyvinyl butyral solution was added and the powders were mixed together so as to obtain a slurry. Subsequently, the thus obtained slurry was formed into a sheet with the use of the doctor blade method, thereby obtaining a green sheet having a thickness of 50 mm. The content of the glass is represented in "parts by weight" per 100 parts by weight of the main component which is xBaO-yTiO$_2$-zRe$_2$O$_3$ or $\{x(Ba_\alpha Ca_\beta Sr_\gamma)O$-y(TiO$_2$)$_{1-m}$(ZrO$_2$)$_m$-zRe$_2$O$_3\}$ (including $\beta+\gamma=0$ or m=0).

Next, a plurality of such green sheets were laminated together and pressed tightly, and further punched, thereby obtaining a plurality of circular pieces each having a diameter of 14 mm and a thickness of 0.5 mm. Subsequently, the thus obtained pieces were subjected to a heating treatment at a temperature of 350° C. so as to remove the binder, and further sintered at the temperatures shown in Tables 5 to 8 in a reductive atmosphere consisting of H$_2$—N$_2$—H$_2$O gas, thereby obtaining disc-like ceramic pieces. Afterwards, both surfaces of each of the thus obtained disc-like ceramic pieces were coated with an In—Ga electrode material so as to form ceramic condensers.

Then, the electric properties of the ceramic condensers were measured. In detail, the electrostatic capacity and Q were measured under a condition of 1 MHZ and 1 Vrms. Further, the ceramic condenser samples were measured so as to obtain their diameters (D) and thickness (T), thereby obtaining a relative dielectric constant ($\in$r) in accordance with their electrostatic capacity. In addition, the specific resistance was measured at a temperature of 125° C. under a condition where an applied voltage of 250 V had been maintained for 1 minute. The results of the above measurements are as shown in Tables 5 to 8.

As may be clearly understood from Table 1 and Table 5, each of the ceramics of sample numbers 1 to 13, 19, 20, 23 to 25, and 27 to 29, contains a main component which is xBaO-yTiO$_2$-zRe$_2$O$_3$, a first sub-component which is a B$_2$O$_3$—SiO$_2$ glass (not including Pb oxide) and a second sub-component which is at least one substance selected from V oxide and W oxide. Thus, it is possible to obtain a relative dielectric constant of 40 or more, Q value of 1000 or more, an electrical resistivity of 10$^9$ $\Omega$m or more, and it can be sintered at a temperature of 1060° C., which is lower than the melting point (1083° C.) of Cu.

Further, as may be clearly understood from Table 2 and Table 6, each of the ceramics of sample numbers 31 to 42, 48, 49, 52 to 54, 56 to 58, 60, 61, 63 and 64 contain a main component represented by $\{x(Ba_\alpha Ca_\beta Sr_\gamma)O$-y(TiO$_2$)$_{1-m}$(ZrO$_2$)$_m$-zRe$_2$O$_3\}$, including where $\beta+\gamma=0$ or m=0, but not including where $\beta+\gamma=0$ and m=0, a first sub-component which is a B$_2$O$_3$—SiO$_2$ glass (not containing Pb oxide) and a second sub-component which is at least one substance selected from V oxide and W oxide. Thus, it is possible to obtain a relative dielectric constant of 40 or more, Q value of 1000 or more, an electrical resistivity of 10$^9$ $\Omega$m or more at a temperature of 125° C., and it can be sintered at a temperature of 1060° C. which is lower than the melting point (1083° C.) of Cu.

In addition, as in sample numbers 66 and 67 of Table 3 and Table 7, and as in sample numbers 83 to 87 and 93 to 97 of Table 4 and Table 8, if the ceramic further contains a third sub-component which is Cu oxide and a fourth sub-component which is Mn oxide, it can lower the temperature for the sintering treatment and increase the Q value. Further, since the compositions do not contain a Pb oxide component which is easy to evaporate, it is possible to inhibit an undesired variation in the properties of the ceramic, which variation is otherwise likely to occur during the sintering treatment.

Here, an explanation will be given to some reasons as to why the compositions of the present invention is limited in the above manner.

Figure 1:
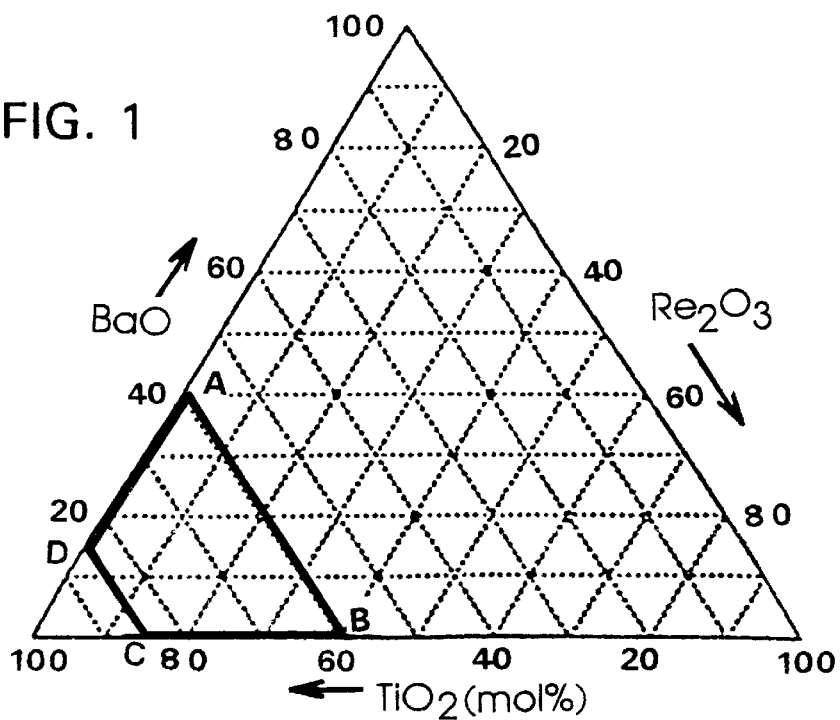
FIG. 1 is a ternary composition diagram (BaO, TiO$_2$, Re$_2$O$_3$) indicating a preferred range for a main component contained in the composition of the present invention.
Figure 2:
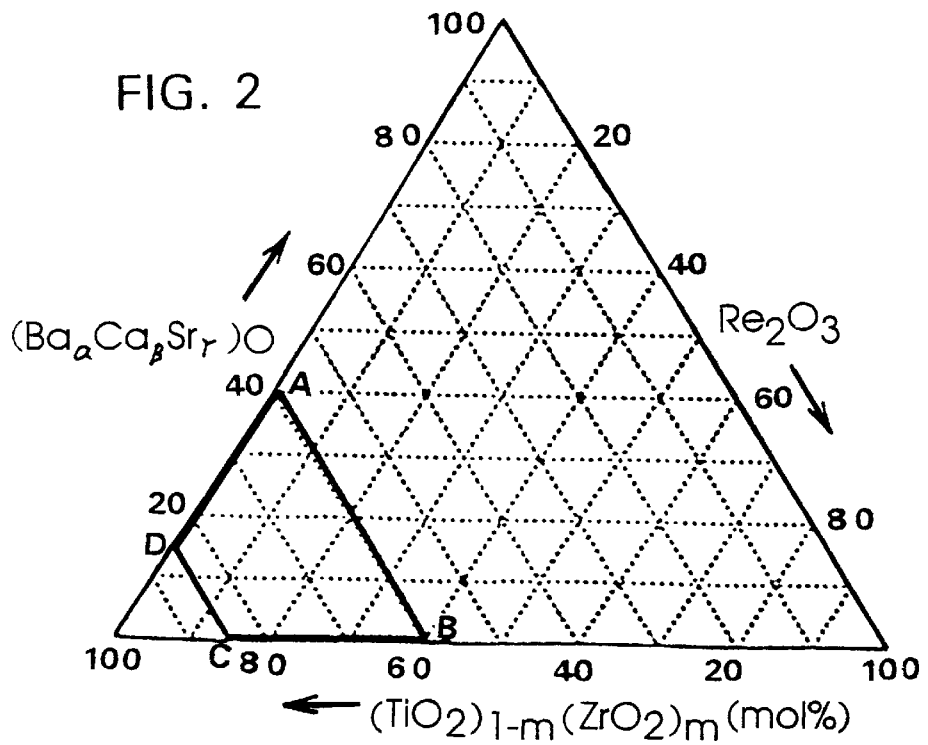
FIG. 2 is a ternary composition diagram {$(Ba_\alpha Ca_\beta Sr_\gamma)O$, $(TiO_2)_{1-m}(ZrO_2)_m$, $Re_2O_3$} indicating a preferred range for a main component contained in the composition of the present invention.

As shown in sample numbers 14 to 17 of Table 1 and Table 5, when the main component (xBaO-yTiO$_2$-zRe$_2$O$_3$) is out of an area surrounded by point A (39.5. 59.5, 1), point B (1, 59.5, 39.5), point C (1, 85, 14) and point D (14, 85, 1) on FIG. 1, which is a ternary composition diagram, and, as shown in sample numbers 43 to 46 of Table 2 and Table 6, when the main component $\{x(Ba_\alpha Ca_\beta Sr_\gamma)O$-y(TiO$_2$)$_{1-m}$(ZrO$_2$)$_m$-zRe$_2$O$_3\}$ (0$\leq\beta+\gamma$<0.8, 0$\leq$m<0.15, but not where $\beta+\gamma=0$ and m=0) in which BaO and TiO$_2$ have been replaced by Ca or Sr and ZrO$_2$, is outside of the area surrounded by point A (39.5, 59.5, 1), point B (1, 59.5, 39.5), point C (1, 85, 14) and point D (14, 85, 1) on FIG. 2 which is a ternary composition diagram, the relative dielectric constants of these samples will be less than 40 and their Q values will be less than 1000. For this reason, it is preferred that the main component should have a content which is within an area surrounded by points A, B, C, D on both FIG. 1 or FIG. 2.

As in sample numbers 60 and 61 of Table 2 and Table 6, if BaO is partially replaced by Ca or Sr, one can obtain an effect that their relative dielectric constants may be increased. On the other hand, as in a sample number 62, if there is total replacement amount of a Ca oxide and Sr oxide, i.e., if $\beta+\gamma$ is more than 0.8, sinterability will be undesirably decreased and it is impossible to perform a sintering treatment at a temperature of 1060° C. which is lower than the softening point of Cu. For this reason, it is preferred that $\beta+\gamma$ is less than 0.8.

Further, as in sample numbers 63 and 64, if TiO$_2$ is partially replaced by ZrO$_2$, the electrical resistivity at a temperature of 125° C. will become large. On the other hand, as in sample number 65, if the replacement amount m of $ZrO_2$ is 0.15 or more, the sinterability will be undesirably decreased and it is impossible to perform a sintering treatment at a temperature of 1060° C. or lower. For this reason, it is preferred that the replacement amount m of $ZrO_2$ should be less than 0.15.

Moreover, as in sample number 18 of Table 1 and Table 5 and as in sample number 47 of Table 2 and Table 6, if the sample does not contain the first sub-component which is $B_2O_3$—$SiO_2$ glass, it is impossible to perform a sintering treatment at a temperature of 1060° C. or lower. On the other hand, as in sample number 21 of Table 5 and as in a sample number 50 of Table 2 and Table 6, if the content of the $B_2O_3$—$SiO_2$ glass exceeds about 25 parts by weight, the Q value will be less than 1000, and an electrical resistivity at a temperature of 125° C. will be lower than $10^9$ Ωm. For this reason, it is preferred that the content of the first sub-component which is $B_2O_3$—$SiO_2$ glass should be about 25 parts by weight or less.

In addition, as in sample number 22 of Table 1 and Table 5 and as in sample number 51 of Table 2 and Table 6, if a sample does not contain the second sub-component which is V oxide or W oxide, it is impossible to perform a sintering treatment at a temperature of 1060° C. or lower. On the other hand, as in sample number 26 of Table 1 and Table 5 and as in sample number 55 of Table 2 and Table 6, in case where the content of $V_2O_5$ is more than about 10 parts by weight and in case where the content of $WO_3$ is more than about 20 parts by weight as in sample number 30 of Table 1 and Table 5 and as in sample number 59 of Table 2 and Table 6, the Q value in each case is less than 1000, and electrical resistivity at a temperature of 125° C. will be lower than $10^9$ Ωm. For this reason, it is preferred that the content of the second sub-component which is at least one substance selected from V oxide and W oxide should be as follows, i.e., the content of V oxide calculated as $V_2O_5$ should be about 10 parts by weight or less and the content of W oxide calculated as $WO_3$ should be about 20 parts by weight or less.

Further, where the content of CuO is more than 10 parts by weight as in sample number 68 of Table 3 and Table 7 and as in sample number 98 of Table 4 and Table 8, the Q value in each case is less than 1000 and electrical resistivity at a temperature of 125° C. will be lower than $10^9$ Ωm. For this reason, it is preferred that the content of the third sub-component which is Cu oxide should be about 10 parts by weight or less if it is in the form of CuO.

Moreover, in a case where MnO is more than 20 parts by weight as in a sample number 88 of Table 4 and Table 8, the Q value is less than 1000, and electrical resistivity at a temperature of 125° C. will be lower than $10^9$ Ωm. For this reason, it is preferred that the content of the fourth sub-component which is Mn oxide should be about 20 parts by weight or less if it is in the form of MnO.

Example 2

A laminated ceramic condenser made according to an embodiment of the present invention will be described in the following.

The starting raw materials were barium carbonate ($BaCO_3$), calcium carbonate ($CaCO_3$), strontium carbonate ($SrCO_3$), titanium oxide ($TiO_2$), zirconium oxide ($ZrO_2$), rare earth oxide ($Re_2O_3$), vanadium oxide ($V_2O_5$), tungsten oxide ($WO_3$), copper oxide (CuO) and manganese carbonate ($MnCO_3$).

Powders of the above starting raw materials were taken by weighing so as to obtain the compositions of sample numbers 101 and 103 of Table 9 (not including a first sub-component which is a $B_2O_3$—$SiO_2$ glass component) Then these raw material powders and ethanol were put into a ball-mill and were mixed together in a wet manner for 16 hours, followed by a pre-sintering treatment at a temperature of 1040° C., thereby obtaining a pre-sintered powder material. The contents of $V_2O_5$, and $WO_3$ which together serve as the second sub-component, the content of CuO serving as the third sub-component, the content of MnO serving as the fourth sub-component, are all represented in parts by weight per 100 parts by weight of a main component which is $\{x(Ba_\alpha Ca_\beta Sr_\gamma)O\text{-}y(TiO_2)_{1-m}(ZrO_2)_m\text{-}zRe_2O_3\}$ (including where $\beta+\gamma=0$ or $m=0$).

Further, as the first sub-component, a $B_2O_3$—$SiO_2$ glass powder was prepared which had a softening point of 600° C. and may be represented by 60BaO—15$B_2O_3$—5$Li_2O$—20$SiO_2$ (where these numerical factors are in the form of weight %).

Then, 100 parts by weight of the above pre-sintered powders and 10 parts by weight of the above glass powder were mixed together with a polyvinyl butyral solution so as to obtain a slurry. Subsequently, the thus obtained slurry was formed into a sheet with the use of the doctor blade method, thereby obtaining a green sheet.

Next, an electrically conductive paste containing Cu as its main component was printed on the green sheet, so as to form an electrically conductive paste layer forming the internal electrodes. After that, a plurality of such green sheets each having formed thereon an electrically conductive paste layer were laminated together in a manner such that the electrically conductive paste layers are alternatively exposed on each end face of thus formed laminated body. Further, each end face of the laminated body on which the electrically conductive paste layers are exposed thereon was coated with an electrically conductive paste containing Cu as its main component, thereby obtaining a further treated laminated body. In addition, the thus obtained laminated body was heated at a temperature of 350° C. in an atmosphere of $N_2$ gas, so as to receive a predetermined heating treatment, thereby removing the formerly added binder. Finally, the thus treated laminated body was put in a reductive atmosphere consisting of $H_2$—$N_2$—$H_2O$ gas and kept at a temperature of 1000° C. for 2 hours, so as to effect a predetermined sintering treatment, thereby obtaining a desired laminated ceramic condenser.

The thus obtained laminated ceramic condenser has a width of 1.6 mm, a length of 3.2 mm and a thickness of 1.2 mm. Each of the dielectric ceramic layers interposed between the internal electrodes has a thickness of 6 m, with the total number of effective dielectric ceramic layers being 150 layers in all.

Moreover, as comparative examples, some other laminated ceramic condensers were prepared using the dielectric materials which are the compositions shown in sample numbers 102, 104 of Table 9.

Namely, the starting raw materials barium carbonate ($BaCO_3$), calcium carbonate ($CaCO_3$), strontium carbonate ($SrCO_3$), titanium oxide ($TiO_2$), zirconium oxide ($ZrO_2$), rare earth oxide ($Re_2O_3$), vanadium oxide ($V_2O_5$), tungsten oxide ($WO_3$), copper oxide (CuO), manganese carbonate ($MnCO_3$), boron oxide ($B_2O_3$) and silicon oxide ($SiO_2$).

The powders of the above starting raw materials were taken by weighing so as to obtain the compositions of sample numbers 102 and 104 of Table 9 (but not including $B_2O_3$ and $SiO_2$). Then, these raw material powders and ethanol were moved into a ball-mill and were mixed together in a wet manner, followed by a pre-sintering treatment at a temperature of 1040° C., thereby obtaining a pre-sintered powder material. The contents of $V_2O_5$ and $WO_3$ which together serve as the second sub-component, the content of CuO serving as the third sub-component, and the content of MnO serving as the fourth sub-component are all represented in parts by weight per 100 parts by weight of a main component which is $\{x(Ba_\alpha Ca_\beta Sr_\gamma)O\text{-}y(TiO_2)_{1-m}(ZrO_2)_m\text{-}zRe_2O_3\}$, including where $\beta+\gamma=0$ or $m=0$.

Then, 100 parts by weight of the above pre-sintered powders, 5 parts by weight of boron oxide ($B_2O_3$) and 5 parts by weight of silicon oxide ($SiO_2$) were mixed together with a polyvinyl butyral solution so as to obtain a slurry. Subsequently, the thus obtained slurry was formed into a sheet with the use of the doctor blade method, thereby obtaining a green sheet. After that, laminated ceramic condensers were produced in the same manner as in the above sample numbers 101 and 103.

Next, a moisture proof load test was conducted on the laminated ceramic condensers of sample numbers 101 to 104 in Table 9. In detail, the condensers were put in an atmosphere having a pressure of 2 atmospheres, a relative humidity of 100%, and a temperature of 121° C. Then, a DC voltage of 16 V was continuously applied to the condensers for 250 hours. During this test, when an insulating resistance of the condensers became $1\times10^6\Omega$ or lower, it was determined that there was a failure (defect). The test results are shown in Table 10. As may be clearly understood from sample numbers 101 and 103 of Table 9 and Table 10, the laminated ceramic condensers of the present invention containing B component and Si component as glass components, did not produce any defects which will otherwise be caused during the above moisture proof load test, thereby proving that they have an excellent moisture proof property. In contrast, as shown by sample numbers 102 and 104, it was found that the condensers not in the scope of the present invention, containing boron oxide ($B_2O_3$) serving as B component and silicon oxide ($SiO_2$) serving as Si component but not containing a glass component, had produced some defects during the above moisture proof load test and hence do not have an excellent moisture proof property. This fact proves that the presence of a $B_2O_3$—$SiO_2$ glass can provide an effect of improving the moisture proof property.

In the above-discussed embodiments, barium carbonate ($BaCO_3$), calcium carbonate ($CaCO_3$), strontium carbonate ($SrCO_3$), titanium oxide ($TiO_2$), zirconium oxide ($ZrO_2$), rare earth oxide ($Re_2O_3$), vanadium oxide ($V_2O_5$), tungsten oxide ($WO_3$), copper oxide (CuO) and manganese carbonate ($MnCO_3$) were mixed together only once in only one operation and then subjected to a pre-sintering treatment. However, it is also possible that barium carbonate ($BaCO_3$), calcium carbonate ($CaCO_3$), strontium carbonate ($SrCO_3$), titanium oxide ($TiO_2$), zirconium oxide ($ZrO_2$) and rare earth oxide ($Re_2O_3$) may be at first mixed together and then followed by a pre-sintering treatment, thereby obtaining a pre-sintered material. Then, the vanadium oxide ($V_2O_5$), tungsten oxide ($WO_3$), copper oxide (CuO) and manganese carbonate ($MnCO_3$) can be added in the pre-sintered material, thereby obtaining the similar effects.

The present invention is not limited to barium carbonate ($BaCO_3$), calcium carbonate ($CaCO_3$), strontium carbonate ($SrCO_3$), titanium oxide ($TiO_2$), zirconium oxide ($ZrO_2$), rare earth oxide ($Re_2O_3$), vanadium oxide ($V_2O_5$), tungsten oxide ($WO_3$), copper oxide (CuO) and manganese carbonate ($MnCO_3$). In fact, it is also possible to use other compounds including $BaTiO_3$, $BaZrO_3$, $CaTiO_3$, $CaZrO_3$, $SrTiO_3$, $SrZrO_3$ and $Re_2Ti_2O_7$, and alternatively it is permitted to utilize a carbonate, an oxalate, a hydroxide, an alkoxide, etc., thereby obtaining similar useful properties.

Moreover, as a glass component, what has been described in the above is a $B_2O_3$—$Li_2O$—$SiO_2$—MnO glass powder, but the glass component is not necessarily limited to such a specific material. In fact, it is also possible to use a glass containing B component and Si component together serving as its main component, provided that it is a glass not containing Pb oxide.

In addition, if the above condenser is used to form a laminated LC filter or the like, it is also possible to obtain the same excellent effects as those obtained in the above embodiments.

As may be clearly understood from the above description, it is allowed to conduct a sintering treatment at a temperature of 1060° C. or lower, obtain a relative dielectric constant of 40 or more and a Q value of 1000 or more, and further obtain a high electrical resistivity with the use of the dielectric ceramic composition made according to the present invention. Moreover, since there is no volatilization of a Pb oxide component, it is possible to produce dielectric ceramic compositions having relatively uniform properties.

Therefore, if such dielectric ceramic compositions are used to form dielectric ceramic layers to produce a laminated ceramic condenser and a laminated LC filter or the like, it is possible to utilize cheap electrode materials such as Cu and Ag, thereby making it possible to manufacture the laminated ceramic parts with a reduced cost.

TABLE 1

| Sample Number | $xBaO$—$yTiO_2$—$zRe_2O_3$ | | | | First Sub-Component | Second Sub-Component | |
|---|---|---|---|---|---|---|---|
| | x | y | z | Re Kind and Mole Ratio | $B_2O_3$—$SiO_2$ Glass | $V_2O_5$ | $WO_3$ |
| | Mol % | | | | Parts By Weight | | |
| 1 | 6 | 68 | 26 | Nd = 100 | 10 | 1 | 0 |
| 2 | 6 | 68 | 26 | Nd = 100 | 10 | 0 | 1 |
| 3 | 6 | 68 | 26 | Nd = 100 | 10 | 0.5 | 0.5 |
| 4 | 6 | 68 | 26 | Er/Pr = 95/5 | 12 | 0.8 | 0 |
| 5 | 6 | 68 | 26 | Er/Nd/Pr = 90/5/5 | 12 | 0.8 | 0 |
| 6 | 6 | 68 | 26 | Er/Nd/Pr = 80/10/10 | 12 | 0.8 | 0 |
| 7 | 6 | 68 | 26 | Er/Nd/Pr = 70/15/15 | 12 | 0.8 | 0 |
| 8 | 6 | 68 | 26 | Er/Nd/Pr = 60/20/20 | 12 | 0.8 | 0 |
| 9 | 6 | 68 | 26 | Er/La = 95/5 | 18 | 0 | 1.5 |

TABLE 1-continued

| | $x$BaO—$y$TiO$_2$—$z$Re$_2$O$_3$ | | | | First Sub-Component | Second Sub-Component | |
|---|---|---|---|---|---|---|---|
| | | | | Re | B$_2$O$_3$—SiO$_2$ | | |
| Sample | $x$ | $y$ | $z$ | Kind and Mole | Glass | V$_2$O$_5$ | WO$_3$ |
| Number | Mol % | | | Ratio | Parts By Weight | | |
| 10 | 6 | 68 | 26 | Er/Nd/La = 90/5/5 | 18 | 0 | 1.5 |
| 11 | 6 | 68 | 26 | Er/Nd/La = 80/10/10 | 18 | 0 | 1.5 |
| 12 | 6 | 68 | 26 | Er/Nd/La = 70/15/15 | 18 | 0 | 1.5 |
| 13 | 6 | 68 | 26 | Er/Nd/La = 60/20/20 | 18 | 0 | 1.5 |
| *14 | 22 | 58 | 20 | Nd/Sm/Ce = 90/7/3 | 7 | 0.5 | 0.5 |
| *15 | 0.5 | 73.5 | 26 | Nd/Sm/Ce = 90/7/3 | 7 | 0.5 | 0.5 |
| *16 | 4 | 88 | 8 | Nd/Sm/Ce = 90/7/3 | 7 | 0.5 | 0.5 |
| *17 | 29.5 | 70 | 0.5 | Nd/Sm/Ce = 90/7/3 | 7 | 0.5 | 0.5 |
| *18 | 6 | 68 | 26 | Nd/Sm/Ce = 90/7/3 | 0 | 0.5 | 0.5 |
| 19 | 6 | 68 | 26 | Nd/Sm/Ce = 90/7/3 | 7 | 0.5 | 0.5 |
| 20 | 6 | 68 | 26 | Nd/Sm/Ce = 90/7/3 | 25 | 0.5 | 0.5 |
| *21 | 6 | 68 | 26 | Nd/Sm/Ce = 90/7/3 | 30 | 0.5 | 0.5 |
| *22 | 6 | 68 | 26 | Nd/Sm/Ce = 90/7/3 | 7 | 0 | 0 |
| 23 | 6 | 68 | 26 | Nd/Sm/Ce = 90/7/3 | 7 | 3 | 0 |
| 24 | 6 | 68 | 26 | Nd/Sm/Ce = 90/7/3 | 7 | 5 | 0 |
| 25 | 6 | 68 | 26 | Nd/Sm/Ce = 90/7/3 | 7 | 10 | 0 |
| *26 | 6 | 68 | 26 | Nd/Sm/Ce = 90/7/3 | 7 | 15 | 0 |
| 27 | 6 | 68 | 26 | Nd/Sm/Ce = 90/7/3 | 7 | 0 | 5 |
| 28 | 6 | 68 | 26 | Nd/Sm/Ce = 90/7/3 | 7 | 0 | 10 |
| 29 | 6 | 68 | 26 | Nd/Sm/Ce = 90/7/3 | 7 | 0 | 20 |
| *30 | 6 | 68 | 26 | Nd/Sm/Ce = 90/7/3 | 7 | 0 | 25 |

TABLE 2

| | $x$(Ba$_\alpha$Ca$_\beta$Sr$_\gamma$)O—$y$(TiO$_2$)$_{1-m}$(ZrO$_2$)$_m$—$z$Re$_2$O$_3$ | | | | | | | First Sub-Component | Second Sub-Component | |
|---|---|---|---|---|---|---|---|---|---|---|
| | $x$ | | | | $y$ | | $z$ | Re | B$_2$O$_3$—SiO$_2$ | |
| Sample | (mol %) | $\alpha$ | $\beta$ | $\gamma$ | (mol %) | $m$ | (mol %) | Kind and Mole | Glass | V$_2$O$_5$ | WO$_3$ |
| Number | | | | | | | | Ratio | Parts By Weight | | |
| 31 | 14 | 0.7 | 0.1 | 0.2 | 72 | 0.03 | 14 | Sm/Dy/Ho = 60/30/10 | 10 | 2 | 0 |
| 32 | 14 | 1 | 0 | 0 | 72 | 0.04 | 14 | Er/Nd/SM = 70/20/10 | 15 | 0 | 3 |
| 33 | 6 | 1 | 0 | 0 | 80 | 0.02 | 14 | Er/Pr = 95/5 | 15 | 0.5 | 0 |
| 34 | 6 | 1 | 0 | 0 | 80 | 0.02 | 14 | Er/Sm/Pr = 90/5/5 | 15 | 0.5 | 0 |
| 35 | 6 | 1 | 0 | 0 | 80 | 0.02 | 14 | Er/Sm/Pr = 80/10/10 | 15 | 0.5 | 0 |
| 36 | 6 | 1 | 0 | 0 | 80 | 0.02 | 14 | Er/Sm/Pr = 70/15/15 | 15 | 0.5 | 0 |
| 37 | 6 | 1 | 0 | 0 | 80 | 0.02 | 14 | Er/Sm/Pr = 60/20/20 | 15 | 0.5 | 0 |
| 38 | 6 | 1 | 0 | 0 | 80 | 0.02 | 14 | Er/La = 95/5 | 20 | 0 | 1 |
| 39 | 6 | 1 | 0 | 0 | 80 | 0.02 | 14 | Er/Sm/La = 90/5/5 | 20 | 0 | 1 |
| 40 | 6 | 1 | 0 | 0 | 80 | 0.02 | 14 | Er/Sm/La = 80/10/10 | 20 | 0 | 1 |
| 41 | 6 | 1 | 0 | 0 | 80 | 0.02 | 14 | Er/Sm/La = 70/15/15 | 20 | 0 | 1 |
| 42 | 6 | 1 | 0 | 0 | 80 | 0.02 | 14 | Er/Sm/La = 60/20/20 | 20 | 0 | 1 |
| *43 | 22 | 0.8 | 0.1 | 0.1 | 58 | 0.03 | 20 | Nd/La = 95/5 | 7 | 1 | 0.5 |
| *44 | 0.5 | 0.8 | 0.1 | 0.1 | 73.5 | 0.03 | 26 | Nd/La = 95/5 | 7 | 1 | 0.5 |
| *45 | 4 | 0.8 | 0.1 | 0.1 | 88 | 0.03 | 8 | Nd/La = 95/5 | 7 | 1 | 0.5 |
| *46 | 29.5 | 0.8 | 0.1 | 0.1 | 70 | 0.03 | 0.5 | Nd/La = 95/5 | 7 | 1 | 0.5 |
| *47 | 6 | 0.8 | 0.1 | 0.1 | 68 | 0.03 | 26 | Nd/La = 95/5 | 0 | 0.5 | 0.5 |
| 48 | 6 | 0.8 | 0.1 | 0.1 | 68 | 0.03 | 26 | Nd/La = 95/5 | 7 | 0.5 | 0.5 |
| 49 | 6 | 0.8 | 0.1 | 0.1 | 68 | 0.03 | 26 | Nd/La = 95/5 | 25 | 0.5 | 0.5 |
| *50 | 6 | 0.8 | 0.1 | 0.1 | 68 | 0.03 | 26 | Nd/La = 95/5 | 30 | 0.5 | 0.5 |
| *51 | 6 | 0.8 | 0.1 | 0.1 | 68 | 0.03 | 26 | Nd/La = 95/5 | 7 | 0 | 0 |
| 52 | 6 | 0.8 | 0.1 | 0.1 | 68 | 0.03 | 26 | Nd/La = 95/5 | 7 | 3 | 0 |
| 53 | 6 | 0.8 | 0.1 | 0.1 | 68 | 0.03 | 26 | Nd/La = 95/5 | 7 | 5 | 0 |
| 54 | 6 | 0.8 | 0.1 | 0.1 | 68 | 0.03 | 26 | Nd/La = 95/5 | 7 | 10 | 0 |
| *55 | 6 | 0.8 | 0.1 | 0.1 | 68 | 0.03 | 26 | Nd/La = 95/5 | 7 | 15 | 0 |
| 56 | 6 | 0.8 | 0.1 | 0.1 | 68 | 0.03 | 26 | Nd/La = 95/5 | 7 | 0 | 5 |
| 57 | 6 | 0.8 | 0.1 | 0.1 | 68 | 0.03 | 26 | Nd/La = 95/5 | 7 | 0 | 10 |
| 58 | 6 | 0.8 | 0.1 | 0.1 | 68 | 0.03 | 26 | Nd/La = 95/5 | 7 | 0 | 20 |
| *59 | 6 | 0.8 | 0.1 | 0.1 | 68 | 0.03 | 26 | Nd/La = 95/5 | 7 | 0 | 25 |
| 60 | 6 | 1 | 0 | 0 | 68 | 0.03 | 26 | Nd/La = 95/5 | 7 | 0.5 | 0.5 |
| 61 | 6 | 0.4 | 0.3 | 0.3 | 68 | 0.03 | 26 | Nd/La = 95/5 | 7 | 0.5 | 0.5 |
| *62 | 6 | 0.2 | 0.4 | 0.4 | 68 | 0.03 | 26 | Nd/La = 95/5 | 7 | 0.5 | 0.5 |
| 63 | 6 | 0.8 | 0.1 | 0.1 | 68 | 0 | 26 | Nd/La = 95/5 | 7 | 0.5 | 0.5 |

TABLE 2-continued

| | $x(Ba_\alpha Ca_\beta Sr_\gamma)O$—$y(TiO_2)_1$ $m(ZrO_2)_m$—$zRe_2O_3$ | | | | | | | First Sub-Component | Second Sub-Component | |
|---|---|---|---|---|---|---|---|---|---|---|
| | | | | | | | Re | $B_2O_3$—$SiO_2$ | $V_2O_5$ | $WO_3$ |
| Sample | x | | | | y | | z | Kind and Mole | Glass | | |
| Number | (mol %) | α | β | γ | (mol %) | m | (mol %) | Ratio | Parts By Weight | | |
| 64 | 6 | 0.8 | 0.1 | 0.1 | 68 | 0.10 | 26 | Nd/La = 95/5 | 7 | 0.5 | 0.5 |
| *65 | 6 | 0.8 | 0.1 | 0.1 | 68 | 0.15 | 26 | Nd/La = 95/5 | 7 | 0.5 | 0.5 |

TABLE 3

| | $x(Ba_\alpha Ca_\beta Sr_\gamma)O$—$y(TiO_2)_1$ $m(ZrO_2)_m$—$zRe_2O_3$ | | | | | | | First Sub-Component | Second Sub-Component | | Third Sub-Component |
|---|---|---|---|---|---|---|---|---|---|---|---|
| | | | | | | | Re | $B_2O_3$—$SiO_2$ | $V_2O_5$ | $WO_3$ | CuO |
| Sample | x | | | | y | | z | Kind and Mole | Glass | | | |
| Number | (mol %) | α | β | γ | (mol %) | m | (mol %) | Ratio | Parts By Weight | | | |
| 66 | 6 | 1 | 0 | 0 | 68 | 0 | 26 | Nd/Sm/Ce = 90/7/3 | 7 | 0.5 | 0.5 | 3 |
| 67 | 6 | 1 | 0 | 0 | 68 | 0 | 26 | Nd/Sm/Ce = 90/7/3 | 7 | 0.5 | 0.5 | 10 |
| *68 | 6 | 1 | 0 | 0 | 68 | 0 | 26 | Nd/Sm/Ce = 90/7/3 | 7 | 0.5 | 0.5 | 15 |
| 69 | 14 | 1 | 0 | 0 | 72 | 0.04 | 14 | Er/Nd/Sm = 70/20/10 | 15 | 0 | 3 | 1 |

TABLE 4

| | $x(Ba_\alpha Ca_\beta Sr_\gamma)O$—$y(TiO_2)_1$ $m(ZrO_2)_m$—$zRe_2O_3$ | | | | | | | First Sub-Component | Second Sub-Component | | Third Sub-Component | Fourth Sub-Component |
|---|---|---|---|---|---|---|---|---|---|---|---|---|
| | | | | | | | | Re | $B_2O_3$—$SiO_2$ | $V_2O_5$ | $WO_3$ | CuO | MnO |
| Sample | x | | | | y | | z | Kind and Mole | Glass | | | | |
| Number | (mol %) | α | β | γ | (mol %) | m | (mol %) | Ratio | Parts By Weight | | | | |
| 70 | 39.5 | 0.6 | 0.2 | 0.2 | 59.5 | 0.01 | 1 | Nd/Sm/Er = 70/20/10 | 10 | 1 | 0.5 | 1 | 1 |
| 71 | 1 | 0.6 | 0.2 | 0.2 | 59.5 | 0.01 | 39.5 | Nd/Sm/Er = 70/20/10 | 10 | 1 | 0.5 | 1 | 1 |
| 72 | 1 | 0.6 | 0.2 | 0.2 | 85 | 0.01 | 14 | Nd/Sm/Er = 70/20/10 | 10 | 1 | 0.5 | 1 | 1 |
| 73 | 14 | 0.6 | 0.2 | 0.2 | 85 | 0.01 | 1 | Nd/Sm/Er = 70/20/10 | 10 | 1 | 0.5 | 1 | 1 |
| 74 | 30 | 0.6 | 0.2 | 0.2 | 64 | 0.01 | 6 | Nd/Sm/Er = 70/20/10 | 10 | 1 | 0.5 | 1 | 1 |
| 75 | 12 | 0.6 | 0.2 | 0.2 | 64 | 0.01 | 24 | Nd/Sm/Er = 70/20/10 | 10 | 1 | 0.5 | 1 | 1 |
| 76 | 6 | 0.6 | 0.2 | 0.2 | 68 | 0.01 | 26 | Nd/Sm/Er = 70/20/10 | 10 | 1 | 0.5 | 1 | 1 |
| 77 | 6 | 0.6 | 0.2 | 0.2 | 80 | 0.01 | 14 | Nd/Sm/Er = 70/20/10 | 10 | 1 | 0.5 | 1 | 1 |
| 78 | 18 | 0.6 | 0.2 | 0.2 | 76 | 0.01 | 6 | Nd/Sm/Er = 70/20/10 | 10 | 1 | 0.5 | 1 | 1 |
| 79 | 14 | 0.6 | 0.2 | 0.2 | 72 | 0.01 | 14 | Nd/Sm/Er = 70/20/10 | 10 | 1 | 0.5 | 1 | 1 |
| 80 | 12 | 1 | 0 | 0 | 64 | 0.01 | 24 | Er/Dy/Nd = 70/20/10 | 8 | 1 | 0 | 0.5 | 0.5 |
| 81 | 12 | 1 | 0 | 0 | 64 | 0.01 | 24 | Er/Dy/Nd = 70/20/10 | 8 | 0 | 1 | 0.5 | 0.5 |
| 82 | 12 | 1 | 0 | 0 | 64 | 0.01 | 24 | Er/Dy/Nd = 70/20/10 | 8 | 0.5 | 0.5 | 0.5 | 0.5 |
| 83 | 14 | 1 | 0 | 0 | 72 | 0.04 | 14 | Er/Nd/Sm = 70/20/10 | 15 | 0 | 3 | 1 | 1 |
| 84 | 14 | 1 | 0 | 0 | 72 | 0.04 | 14 | Er/Nd/Sm = 70/20/10 | 15 | 0 | 3 | 1 | 5 |
| 85 | 14 | 1 | 0 | 0 | 72 | 0.04 | 14 | Er/Nd/Sm = 70/20/10 | 15 | 0 | 3 | 1 | 10 |
| 86 | 14 | 1 | 0 | 0 | 72 | 0.04 | 14 | Er/Nd/Sm = 70/20/10 | 15 | 0 | 3 | 1 | 15 |
| 87 | 14 | 1 | 0 | 0 | 72 | 0.04 | 14 | Er/Nd/Sm = 70/20/10 | 15 | 0 | 3 | 1 | 20 |
| *88 | 14 | 1 | 0 | 0 | 72 | 0.04 | 14 | Er/Nd/Sm = 70/20/10 | 15 | 0 | 3 | 1 | 25 |
| 89 | 6 | 1 | 0 | 0 | 68 | 0 | 26 | Nd = 100 | 10 | 1 | 0 | 1 | 3 |
| 90 | 6 | 1 | 0 | 0 | 80 | 0.05 | 14 | Er/Dy/Sm = 70/20/10 | 10 | 2 | 2 | 5 | 10 |
| 91 | 6 | 1 | 0 | 0 | 80 | 0.05 | 14 | Er/Dy/Sm = 70/20/10 | 15 | 2 | 2 | 10 | 15 |
| 92 | 6 | 1 | 0 | 0 | 80 | 0.05 | 14 | Er/Dy/Sm = 70/20/10 | 25 | 3 | 3 | 10 | 20 |
| 93 | 14 | 0.7 | 0.1 | 0.2 | 72 | 0.03 | 14 | Sm/Dy/Ho = 60/30/10 | 10 | 2 | 0 | 0 | 1 |
| 94 | 14 | 0.7 | 0.1 | 0.2 | 72 | 0.03 | 14 | Sm/Dy/Ho = 60/30/10 | 10 | 2 | 0 | 1 | 1 |
| 95 | 14 | 0.7 | 0.1 | 0.2 | 72 | 0.03 | 14 | Sm/Dy/Ho = 60/30/10 | 10 | 2 | 0 | 3 | 1 |
| 96 | 14 | 0.7 | 0.1 | 0.2 | 72 | 0.03 | 14 | Sm/Dy/Ho = 60/30/10 | 10 | 2 | 0 | 5 | 1 |
| 97 | 14 | 0.7 | 0.1 | 0.2 | 72 | 0.03 | 14 | Sm/Dy/Ho = 60/30/10 | 10 | 2 | 0 | 10 | 1 |
| *98 | 14 | 0.7 | 0.1 | 0.2 | 72 | 0.03 | 14 | Sm/Dy/Ho = 60/30/10 | 10 | 2 | 0 | 15 | 1 |

TABLE 5

| Sample Number | Sintering Temperature (° C.) | Relative Dielectric Constant 1 MHz | Q 1 MHz | Electrical Resistivity ρ 125° C. (Ωm) |
|---|---|---|---|---|
| 1 | 1050 | 47 | 1700 | $3.7 \times 10^9$ |
| 2 | 1050 | 46 | 1600 | $3.1 \times 10^9$ |
| 3 | 1050 | 47 | 1800 | $3.6 \times 10^9$ |
| 4 | 990 | 49 | 2800 | $2.4 \times 10^{10}$ |
| 5 | 990 | 52 | 2600 | $2.0 \times 10^{10}$ |
| 6 | 1000 | 55 | 2500 | $9.6 \times 10^9$ |
| 7 | 1000 | 58 | 2500 | $8.6 \times 10^9$ |
| 8 | 1020 | 61 | 2300 | $5.4 \times 10^9$ |
| 9 | 980 | 48 | 2600 | $9.8 \times 10^9$ |
| 10 | 980 | 51 | 2700 | $8.6 \times 10^9$ |
| 11 | 990 | 53 | 2400 | $7.4 \times 10^9$ |
| 12 | 990 | 55 | 2300 | $5.7 \times 10^9$ |
| 13 | 1000 | 57 | 2100 | $4.1 \times 10^9$ |
| *14 | 1040 | 117 | 200 | $4.8 \times 10^7$ |
| *15 | 1040 | 33 | 1800 | $1.8 \times 10^9$ |
| *16 | 1040 | 34 | 800 | $6.4 \times 10^5$ |
| *17 | 1040 | 64 | 300 | $1.9 \times 10^5$ |
| *18 | 1060 | | Not sintered | |
| 19 | 1040 | 50 | 2300 | $5.4 \times 10^9$ |
| 20 | 1000 | 47 | 1500 | $1.2 \times 10^9$ |
| *21 | 960 | 46 | 400 | $7.6 \times 10^7$ |
| *22 | 1060 | | Not sintered | |
| 23 | 1040 | 47 | 2000 | $9.3 \times 10^9$ |
| 24 | 1030 | 46 | 1800 | $9.1 \times 10^9$ |
| 25 | 1010 | 45 | 1500 | $7.7 \times 10^9$ |
| *26 | 1010 | 44 | 300 | $9.7 \times 10^7$ |
| 27 | 1040 | 48 | 1900 | $8.4 \times 10^9$ |
| 28 | 1030 | 47 | 1700 | $7.7 \times 10^9$ |
| 29 | 990 | 46 | 1500 | $6.1 \times 10^9$ |
| *30 | 990 | 45 | 400 | $2.4 \times 10^5$ |

TABLE 6

| Sample Number | Sintering Temperature (° C.) | Relative Dielectric Constant 1 MHz | Q 1 MHz | Electrical Resistivity ρ 125° C. (Ωm) |
|---|---|---|---|---|
| 31 | 1050 | 65 | 1900 | $4.4 \times 10^9$ |
| 32 | 1050 | 62 | 1700 | $2.7 \times 10^9$ |
| 33 | 990 | 47 | 3200 | $1.2 \times 10^{10}$ |
| 34 | 990 | 49 | 3000 | $9.4 \times 10^9$ |
| 35 | 1000 | 53 | 2900 | $8.4 \times 10^9$ |
| 36 | 1000 | 55 | 2900 | $6.9 \times 10^9$ |
| 37 | 1020 | 57 | 2700 | $5.1 \times 10^9$ |
| 38 | 980 | 48 | 3000 | $9.9 \times 10^9$ |
| 39 | 980 | 49 | 3100 | $8.7 \times 19^9$ |
| 40 | 990 | 53 | 2800 | $6.6 \times 10^9$ |
| 41 | 990 | 55 | 2700 | $5.2 \times 10^9$ |
| 42 | 1000 | 59 | 2500 | $3.7 \times 10^9$ |
| *43 | 1050 | 123 | 100 | $5.4 \times 10^7$ |
| *44 | 1050 | 36 | 2000 | $3.x8 \times 10^9$ |
| *45 | 1050 | 39 | 800 | $8.6 \times 10^8$ |
| *46 | 1050 | 74 | 500 | $2.6 \times 10^8$ |
| *47 | 1060 | | Not sintered | |
| 48 | 1050 | 50 | 2400 | $7.9 \times 10^9$ |
| 49 | 1010 | 46 | 1800 | $4.3 \times 10^9$ |
| *50 | 970 | 46 | 500 | $8.1 \times 10^7$ |
| *51 | 1060 | | Not sintered | |
| 52 | 1040 | 48 | 2100 | $9.7 \times 10^9$ |
| 53 | 1030 | 47 | 1900 | $9.8 \times 10^9$ |
| 54 | 1020 | 46 | 1800 | $9.8 \times 10^9$ |
| *55 | 1020 | 44 | 400 | $2.0 \times 10^3$ |
| 56 | 1040 | 48 | 1800 | $8.7 \times 10^9$ |
| 57 | 1030 | 49 | 2100 | $9.2 \times 10^9$ |
| 58 | 1000 | 47 | 1600 | $8.8 \times 10^9$ |
| *59 | 1000 | 43 | 600 | $3.1 \times 10^8$ |
| 60 | 1040 | 48 | 2300 | $8.6 \times 10^9$ |
| 61 | 1060 | 53 | 1800 | $5.4 \times 10^9$ |
| *62 | 1060 | | Not sintered | |
| 63 | 1030 | 48 | 1800 | $6.7 \times 10^9$ |
| 64 | 1050 | 48 | 1800 | $8.8 \times 10^9$ |
| *65 | 1060 | | Not sintered | |

TABLE 7

| Sample Number | Sintering Temperature (° C.) | Relative Dielectric Constant 1 MHz | Q 1 MHz | Electrical Resistivity ρ 125° C. (Ωm) |
|---|---|---|---|---|
| 66 | 1020 | 51 | 2300 | $6.6 \times 10^9$ |
| 67 | 1000 | 53 | 1800 | $2.7 \times 10^9$ |
| *68 | 970 | 50 | 600 | $2.1 \times 10^8$ |
| 69 | 1040 | 62 | 2300 | $3.5 \times 10^9$ |

TABLE 8

| Sample Number | Sintering Temperature (° C.) | Relative Dielectric Constant 1 MHz | Q 1 MHz | Electrical Resistivity ρ 125° C. (Ωm) |
|---|---|---|---|---|
| 70 | 1030 | 42 | 1500 | $3.9 \times 10^9$ |
| 71 | 1030 | 44 | 1400 | $4.8 \times 10^9$ |
| 72 | 1030 | 42 | 1500 | $5.5 \times 10^9$ |
| 73 | 1030 | 60 | 2000 | $7.6 \times 10^{10}$ |
| 74 | 1030 | 63 | 1500 | $9.6 \times 10^9$ |
| 75 | 1030 | 61 | 1400 | $2.6 \times 10^9$ |
| 76 | 1030 | 49 | 2000 | $5.7 \times 10^9$ |
| 77 | 1030 | 47 | 3000 | $1.2 \times 10^{10}$ |
| 78 | 1030 | 63 | 2200 | $7.7 \times 10^9$ |
| 79 | 1030 | 70 | 2200 | $5.4 \times 10^9$ |
| 80 | 1050 | 60 | 1200 | $2.5 \times 10^9$ |
| 81 | 1050 | 61 | 1300 | $2.8 \times 10^9$ |
| 82 | 1050 | 62 | 1300 | $2.6 \times 10^9$ |
| 83 | 1030 | 63 | 2500 | $6.9 \times 10^9$ |
| 84 | 990 | 64 | 2600 | $7.1 \times 10^9$ |
| 85 | 980 | 64 | 2700 | $7.4 \times 10^9$ |
| 86 | 950 | 65 | 2800 | $8.9 \times 10^9$ |
| 87 | 930 | 64 | 2800 | $8.8 \times 10^9$ |
| *88 | 930 | 61 | 400 | $7.4 \times 10^8$ |
| 89 | 1030 | 49 | 2000 | $6.1 \times 10^9$ |
| 90 | 950 | 46 | 2000 | $8.1 \times 10^9$ |
| 91 | 930 | 45 | 2500 | $7.6 \times 10^9$ |
| 92 | 900 | 43 | 2500 | $6.5 \times 10^9$ |
| 93 | 1040 | 65 | 2400 | $7.3 \times 10^9$ |
| 94 | 1030 | 64 | 2800 | $9.4 \times 10^9$ |
| 95 | 1020 | 63 | 2700 | $3.1 \times 10^{10}$ |
| 96 | 1000 | 64 | 2800 | $5.4 \times 10^{10}$ |
| 97 | 980 | 65 | 2900 | $1.8 \times 10^{10}$ |
| *98 | 970 | 61 | 500 | $1.6 \times 10^8$ |

TABLE 9

| | $x(Ba_\alpha Ca_\beta Sr_\gamma)O$—$y(TiO_2)_{1-m}(ZrO_2)_m$—$zRe_2O_3$ | | | | | | | First Sub-Component $B_2O_3$—$SiO_2$ | | | Second Sub-Component | | Third Sub-Component | Fourth Sub-Component |
|---|---|---|---|---|---|---|---|---|---|---|---|---|---|---|
| | | | | | | | Re | | | | | | | |
| Sample | x | | | | y | | z | Kind and | Glass | $B_2O_3$ | $SiO_2$ | $V_2O_5$ | $WO_3$ | CuO | MnO |
| Number | (mol %) | α | β | γ | (mol %) | m | (mol %) | Mole Ratio | Parts By Weight | | | | | | |
| 101 | 14 | 1 | 0 | 0 | 72 | 0 | 14 | Nd/Sm = 85/15 | 10 | 0 | 0 | 0.5 | 0.5 | 1 | 0.1 |
| *102 | 14 | 1 | 0 | 0 | 72 | 0 | 14 | Nd/Sm = 85/15 | 0 | 5 | 5 | 0.5 | 0.5 | 1 | 0.1 |
| 103 | 6 | 0.9 | 0.05 | 0.05 | 68 | 0.01 | 26 | Er/Nd/Pr = 70/25/5 | 10 | 0 | 0 | 0.5 | 0.5 | 1 | 2 |
| *104 | 6 | 0.9 | 0.05 | 0.05 | 68 | 0.01 | 26 | Er/Nd/Pr = 70/25/5 | 0 | 5 | 5 | 0.5 | 0.5 | 1 | 2 |

TABLE 10

| Sample Number | Sintering Temperature (° C.) | Moisture Proof Load Test Defects |
|---|---|---|
| 101 | 1000 | 0/72 |
| *102 | 1000 | 3/72 |
| 103 | 1000 | 0/72 |
| *104 | 1000 | 4/72 |

What is claimed is:

1. A dielectric ceramic composition comprising:
100 parts by weight of a main component represented by a formula $x(Ba_\alpha Ca_\beta Sr_\gamma)O$-$y(TiO_2)_{1-m}(ZrO_2)_m$-$zRe_2O_3$ wherein $x+y+z=100$, $\alpha+\beta+\gamma=1$, $0 \leq \beta+\gamma < 0.8$, $0 \leq m < 0.15$, Re is at least one rare earth element, in which the mole composition ratio of $(Ba_\alpha Ca_\beta Sr_\gamma)O$, $(TiO_2)_{1-m}(ZrO_2)_m$ and $Re_2O_3$ on a ternary composition diagram thereof is in the area surrounded by point A (39.5. 59.5, 1), point B (1, 59.5, 39.5), point C (1, 85, 14) and point D (14, 85, 1);
about 25 parts by weight or less of a first sub-component which is a Pb-free $B_2O_3$—$SiO_2$ glass;
and a second sub-component which is at least one substance selected from V oxide and W oxide, the content of V oxide being about 10 parts by weight or less and the content of W oxide being about 20 parts by weight or less.

2. The dielectric ceramic composition according to claim 1, wherein said composition further contains a third sub-component that is Cu oxide added in an amount of about 10 parts by weight or less with respect to 100 parts by weight of the main component.

3. The dielectric ceramic composition according to claim 2, wherein said composition further contains a fourth sub-component that is Mn oxide added in an amount of about 20 parts by weight or less with respect to 100 parts by weight of the main component.

4. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 3 and said internal electrodes comprise Cu or Ag.

5. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 2 and said internal electrodes comprise Cu or Ag.

6. The dielectric ceramic composition according to claim 1, wherein said composition further contains a third sub-component that is Mn oxide added in an amount of about 20 parts by weight or less with respect to 100 parts by weight of the main component.

7. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 6 and said internal electrodes comprise Cu or Ag.

8. A dielectric ceramic composition according to claim 1 wherein $\beta+\gamma$ and m equal 0.

9. The dielectric ceramic composition according to claim 8, wherein said composition further contains a third sub-component that is Cu oxide added in an amount of about 10 parts by weight or less with respect to 100 parts by weight of the main component.

10. The dielectric ceramic composition according to claim 9, wherein said composition further contains a fourth sub-component that is Mn oxide added in an amount of about 20 parts by weight or less with respect to 100 parts by weight of the main component.

11. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 10 and said internal electrodes comprise Cu or Ag.

12. The dielectric ceramic composition according to claim 8, wherein said composition further contains a third sub-component that is Mn oxide added in an amount of about 20 parts by weight or less with respect to 100 parts by weight of the main component.

13. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 8 and said internal electrodes comprise Cu or Ag.

14. A dielectric ceramic composition according to claim 1, wherein one of β+γ and m is 0 and the other is not 0.

15. The dielectric ceramic composition according to claim 14, wherein said composition further contains a third sub-component that is Cu oxide added in an amount of about 10 parts by weight or less with respect to 100 parts by weight of the main component.

16. The dielectric ceramic composition according to claim 15, wherein said composition further contains a fourth sub-component that is Mn oxide added in an amount of about 20 parts by weight or less with respect to 100 parts by weight of the main component.

17. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 16 and said internal electrodes comprise Cu or Ag.

18. The dielectric ceramic composition according to claim 14, wherein said composition further contains a third sub-component that is Mn oxide added in an amount of about 20 parts by weight or less with respect to 100 parts by weight of the main component.

19. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 14 and said internal electrodes comprise Cu or Ag.

20. A laminated ceramic part comprising a plurality of dielectric ceramic layers, internal electrodes formed between the dielectric ceramic layers, and external electrodes electrically connected with said internal electrodes, wherein said dielectric ceramic layers are a dielectric ceramic composition of claim 1 and said internal electrodes comprise Cu or Ag.

* * * * *